United States Patent Office 3,032,587
Patented May 1, 1962

3,032,587
PROCESS FOR THE PREPARATION OF N-ALKYL-1,1 DIHYDROHEPTAFLUOROBUTYLAMINES
Benjamin David Halpern, 515 Highland Ave., Jenkintown, Pa., and Wolf Karo, 2001B N. John Russell Circle, Elkins Park, Pa.
No Drawing. Filed Mar. 22, 1956, Ser. No. 573,081
2 Claims. (Cl. 260—583)

This invention relates to new organic chemical compounds containing fluorine. In particular it relates to a new series of nitrogen-containing fluorinated secondary amines which can be reacted with acrylyl or methacryl halides to form new monomers of great activity. Such monomers are readily converted to new polymers and copolymers having a higher solvent and oil resistance than similar ion-fluorine containing monomers.

The novel compounds of this invention comprise the N-alkyl secondary amines of dihydrofluorohydrocarbons, in particular secondary amines of 1,1 dihydroheptafluorobutane. This present application is a continuation-in-part of our prior application Serial No. 465,122, filed October 27, 1954, now abandoned, having the same title.

As is well known, organic compounds containing fluorine have different and essentially unpredictable physical and chemical properties as compared with organic compounds containing other halogens. Further, fluoro-organic compounds are difficult to prepare, because of poisonous and unstable by-products. In addition, well-known synthetic organic reactions can not be directly applied to fluoro-organic preparations because of unpredictable instability and by-products. In particular, it is extremely difficult to predict from the prior art a method for preparing good yields of a new fluoro-organic compound which would be safe to conduct and produce a product free from undesirable by-products.

In accordance with the present invention new compounds, namely N-alkyl secondary amines of 1,1 dihydroheptafluorobutane, are prepared in a safe manner and good yield by a new method which avoids undesirable by-products. These novel N-alkyl fluorinated amines, as prepared by this invention, are directly convertible to highly active fluoro-acrylamide monomers by reacting with acrylyl or methacrylyl halide. These fluoro-acrylamide monomers are readily polymerizable to form new high-molecular weight polymers characterized by a higher oil and solvent resistance than similar non-fluoro-polymers.

The general process of this invention comprises the reaction of the corresponding N-alkyl amide of the perfluorinated fatty acid with lithium aluminum hydride in a solvent at such a rate and under such temperature control that the vigorousness of the reaction would not exceed gentle reflux when the solvent is ether. Such an amide is prepared by reacting an ester of perfluorobutyric acid in the cold with the dry amine either directly or in the presence of solvent, and then distilling off the amide. The method of preparing such amides is more fully described in our copending application, Serial No. 462,390, filed October 14, 1954, now abandoned and entitled "N-Alkyl-perfluorobutyramides."

As a specific example, 0.1 mol of N-ethylperfluorobutyramide dissolved in 50 cc. of ether was added to 0.2 mol of lithium aluminum hydride dissolved in 100 cc. ether. The hydride solution was kept cool by an ice bath and the rate of addition of the amide was such that gentle reflux is maintained. After 5 days at room temperature 20 cc. of ethyl acetate was added to decompose the excess hydride. Then 100 cc. of water was added forming aqueous and ether layers. The ether layer was separated off and distilled. The fraction boiling at 96–99° C. represented about 90 percent yield. The fraction had a boiling point of 98.5° at 751 mm., $n_D^{20}$ of 1.3223, $d_{25}$ 1.1884 g./ml. Combustion analysis showed it to be N-ethyl 1,1 dihydroheptafluorobutylamine (carbon) 32.17 (actual), 31.73 (theor.); hydrogen 4.32 (actual), 3.55 (theor.); nitrogen 5.89 (actual), 6.18 (theor.).

In a similar manner other N-alkyl 1,1 dihydroheptafluorobutylamines were formed including the following:

N-R-1,1 DIHYDROHEPTAFLUOROBUTYLAMINE

| R | B.P. °C./mm. Hg | C actual, C Theor. | H actual, H Theor. | N actual, N Theor. |
|---|---|---|---|---|
| Methyl | 83.5/754 | 28.42<br>28.18 | 3.52<br>2.84 | 6.87<br>6.51 |
| N-butyl | 128/754 | 38.44<br>37.66 | 5.34<br>4.73 | 5.63<br>5.49 |
| Isobutyl | 130/765 | 37.79<br>37.66 | 4.8<br>4.73 | 5.6<br>5.49 |

The process may be varied in that other solvents or media may be used. However, it is preferred that the hydride be in excess and that the rate of addition of amide and/or temperature of the mixture be so regulated that the vigorousness of the reaction does not exceed gentle reflux (app. 50° C.). Otherwise, undesirable by-products are formed such as the corresponding aldehydes.

This process is also applicable to N-alkyl amides of other perfluorinated fatty mono- and dibasic acids, such as perfluoroacetic acid, perfluoropropionic and, perfluoroisobutyric acid, perfluorovaleric acid, perfluorosuccinic acid, etc.

The reaction of the novel compounds of this invention with acrylyl and methacryl halides to form reactive monomers and then highly oil and solvent resistant polymers is more fully described in co-pending application of Halpern, Karo and Kline, Serial No. 478,182, filed December 28, 1954, now Patent No. 2,957,914, and entitled "Fluorinated Acrylamide Type Monomers and Polymers."

It is believed that the N-alkyl portion of the secondary amines of the present invention is related to the monomer reactivity and the increased solvent and oil resistance of the polymers so that the compounds of this invention are quite distinguishable from the unsubstituted, primary fluoro-amines described in the prior art.

We claim:
1. A process for preparing a good yield of N-alkyl 1,1 dihydroheptafluorobutylamine free from undesirable by-products, comprising the steps of adding a solution of N-alkylperfluorobutyramide in organic solvent to an excess of lithium aluminum hydride dissolved in an organic solvent and maintained at ice bath temperature at such a rate that the vigorousness of the reaction does not exceed reflux where the solvent is ether, said alkyl group being selected from the group consisting of methyl, ethyl, n-butyl, and isobutyl, allowing said resulting solution to stand at room temperature for about five days, adding ethyl acetate to decompose the excess hydride, adding water to form solvent and water layers and recovering the secondary amine from the solvent layer.

2. Claim 1, where the solvent is ether.

References Cited in the file of this patent

UNITED STATES PATENTS

| | | |
|---|---|---|
| 2,646,449 | Carnahan | July 21, 1953 |
| 2,691,043 | Husted | Oct. 5, 1954 |
| 2,701,814 | Smith | Feb. 8, 1955 |
| 2,727,923 | Husted | Dec. 20, 1955 |

OTHER REFERENCES

Fieser and Fieser: Organic Chemistry, pages 225–226, 2nd ed., 1950.

Metal Hydrides Inc., Bulletin No. 401A, page 4, 12–24 Congress St., Beverly, Mass. (1951).